United States Patent
Lee et al.

(10) Patent No.: US 8,296,796 B2
(45) Date of Patent: Oct. 23, 2012

(54) DIGITAL BROADCASTING RECEIVER AND A DATA PROCESSING METHOD

(75) Inventors: Chul Soo Lee, Seoul (KR); Sang Kil Park, Seoul (KR)

(73) Assignee: LG Electronics Inc., Seoul (KR)

(*) Notice: Subject to any disclaimer, the term of this patent is extended or adjusted under 35 U.S.C. 154(b) by 985 days.

(21) Appl. No.: 12/316,499

(22) Filed: Dec. 11, 2008

(65) Prior Publication Data

US 2009/0150932 A1 Jun. 11, 2009

Related U.S. Application Data

(60) Provisional application No. 61/012,789, filed on Dec. 11, 2007.

(30) Foreign Application Priority Data

Nov. 21, 2008 (KR) .................. 10-2008-0116235

(51) Int. Cl.
G06F 3/00 (2006.01)
G06F 13/00 (2006.01)
H04N 5/445 (2011.01)

(52) U.S. Cl. ............ 725/40; 725/51; 725/112; 348/468

(58) Field of Classification Search .................. None
See application file for complete search history.

(56) References Cited

U.S. PATENT DOCUMENTS

| 5,774,666 | A | * | 6/1998 | Portuesi ...................... 725/110 |
| 2002/0138831 | A1 | * | 9/2002 | Wachtfogel et al. ........... 725/32 |
| 2003/0099464 | A1 | * | 5/2003 | Oh et al. ........................ 386/95 |
| 2005/0090235 | A1 | | 4/2005 | Vermola et al. |
| 2006/0075458 | A1 | * | 4/2006 | Lucas et al. ................... 725/139 |
| 2006/0253442 | A1 | * | 11/2006 | Rhee et al. ...................... 707/8 |
| 2006/0271995 | A1 | * | 11/2006 | Hagawa et al. ............... 725/135 |
| 2007/0101352 | A1 | | 5/2007 | Rabina et al. |
| 2008/0168178 | A1 | * | 7/2008 | Bouazizi ....................... 709/231 |
| 2008/0225892 | A1 | * | 9/2008 | Vare et al. ..................... 370/473 |

FOREIGN PATENT DOCUMENTS

KR 1020070090714 9/2007

* cited by examiner

*Primary Examiner* — Dominic D Saltarelli
*Assistant Examiner* — Jason J Chung
(74) *Attorney, Agent, or Firm* — Lee, Hong, Degerman, Kang & Waimey

(57) ABSTRACT

A digital broadcasting system and a data processing method are disclosed. A data processing method of a digital broadcasting receiver comprises receiving a mobile/handheld (MH) broadcasting signal including mobile service data and main service data; generating RS(Reed-Solomon) frames from the received MH broadcasting signal; extracting ESG (electronic service guide) data from the generated RS frame; extracting SDP (session description protocol) data from the extracted ESG data; checking a port number corresponding to subtitle having reference information, among the extracted SDP data; and controlling the subtitle having reference information using the checked port number so that the subtitle having reference information is displayed.

3 Claims, 12 Drawing Sheets

FIG. 4 v=0
o=jdoe 2890844526 2890842807 IN IP4 10.47.16.5
s=SDP Seminar
i=A Seminar on the session description protocol
u=http://www.example.com/seminars/sdp.pdf
e=j.doe@example.com(Jane Doe)
c=IN IP4 224.2.17.12/127
t=2873397496 2873404696
a=recvonly
m=audio 49170 RTP/AVP 0
m=video 51372 RTP/AVP 99
a=rtpmap:99 h263-1998/90000

FIG.5 m=video <port> RTP/AVP 98
a=rtpmap:98 3gpp-tt/1000
a=fmtp:98 tx=100; ty=100; layer=0; height=80; width=100; max-h=120;
max-w=160; sver=6256,60; tx3g=81...

FIG.6 m=text 11000 RTP/AVP 98
a=rtpmap:98 t140/1000 m=text 11000 RTP/AVP 98 100
a=rtpmap:98 t140/1000
a=rtpmap:100 red/1000
a=fmtp:100 98/98/98

FIG. 7

```
v=0
o=xxx 16813275940 10048872 IN IP4 192.168.7.55
s=xxx.
i=xxx
u=http://www.xxx.com
t=0 0
a=x-iptv-local:xxx
a=x-level:UP
a=x-br:00000000
a=type:broadcast
a=x-iptv-capture:mp2t
a=tool:xxx
a=live:capture:1
a=x-iptv-type:scheduled
m=audio 20002 RTP/AVP 97
a=control:trackID=1
c=IN IP4 234.5.55.100/15
a=fmtp:97 streamtype=5; profile-level-id=254;mode=AAC-hbr;config=1190;
SizeLength=13; IndexLength=3;IndexDeltaLength=3;Profile=1
a=rtpmap:97mpeg4-generic/90000
m=video 20000 RTP/AVP 96
a=control:trackID=1
c=IN IP4 234.5.55.100/15
a=fmtp:96 profile-level-id=42c00c;sprop-parameter-
sets=aM48gA==,Z01AM7kQKD9CAAADAAIAAAMAZR4wZUA=;packetization-
mode=1
a=rtpmap:96 H264/90000
m=video<dedicated_port>RTP/AVP 98
a=rtpmap:98 3gpp-tt/1000
a=fmtp:98 tx=100;ty=100;layer=0;height=90;width=100;sver=6256,60;
tx3g=81...
m=video 11000 RTP/AVP:99
a=rtpmap:99 3gpp-tt/1000
a=fmtp:99 tx=100;ty=100;layer=0;height=90;width=100;sver=6256,60;
tx3g=81...
```

FIG.8

```
v=0
o=xxx 16813275940 10048872 IN IP4 192.168.7.55
s=xxx.
i=xxx
u=http://www.xxx.com
t=0 0
a=x-iptv-local:xxx
a=x-level:UP
a=x-br:00000000
a=type:broadcast
a=x-iptv-capture:mp2t
a=tool:xxx
a=live:capture:1
a=x-iptv-type:scheduled
m=audio 20002 RTP/AVP 97
a=control:trackID=1
c=IN IP4 234.5.55.100/15
a=fmtp:97 streamtype=5; profile-level-id=254;mode=AAC-hbr;config=1190;
SizeLength=13; IndexLength=3;IndexDeltaLength=3;Profile=1
a=rtpmap:97mpeg4-generic/90000
m=video 20000 RTP/AVP 96
a=control:trackID=1
c=IN IP4 234.5.55.100/15
a=fmtp:96 profile-level-id=42c00c;sprop-parameter-
sets=aM48gA==,Z01AM7kQKD9CAAADAAIAAAMAZR4wZUA=;packetization-
mode=1
a=rtpmap:96 H264/90000
m=text<dedicated_port>RTP/AVP 98
a=rtpmap:98 t140/1000
m=text11000RTP/AVP99
a=rtpmap:99 t140/1000
```

FIG. 11

Real-time subtitle data for reference

Fast and convenient OOO proxy driving
<a href="tel:+1-212-555-0101"title="OOO proxy driving">
+1-212-555-0101</a>
24-hour standby mail:<a href="mailto:help@driver.com">help@driver.com</a>

DIGITAL BROADCASTING RECEIVER AND A DATA PROCESSING METHOD

This application claims the benefit of U.S. Provisional Application No. 61/012,789, filed on Dec. 11, 2007, which is hereby incorporated by reference. Also, this application also claims the priority benefit of Korean Application No. 10-2008-0116235, filed on Nov. 21, 2008, which is hereby incorporated by reference.

BACKGROUND OF THE INVENTION

1. Field of the Invention

The present invention relates to a digital broadcasting system, and more particularly, to a digital broadcasting receiver and a method for controlling the same.

2. Discussion of the Related Art

A digital broadcasting system can include a digital broadcasting transmitter and a digital broadcasting receiver. Also, the digital broadcasting transmitter processes data such as broadcasting program in a digital mode, and transmits the processed data to the digital broadcasting receiver. Such a digital broadcasting system will gradually substitute for an analog broadcasting system owing to various advantages such as efficiency in data transmission.

In addition, although a mobile digital broadcasting system has been discussed recently, the mobile digital broadcasting fails to be activated due to a limited profit model. Also, the related art mobile digital broadcasting system has limitation in that subtitle simply provides unidirectional information.

SUMMARY OF THE INVENTION

Accordingly, the present invention is directed to a digital broadcasting receiver and a data processing method that substantially obviate one or more problems due to limitations and disadvantages of the related art.

An object of the present invention is to provide a digital broadcasting receiver and a data processing method that can directly access an entity associated with text, subtitle, etc. using the text, the subtitle, etc., which are provided by a broadcasting station.

Another object of the present invention is to provide a digital broadcasting receiver and a data processing method that can increase use of mobile digital broadcasting by creating a new profit model of a mobile communication provider as well as a broadcasting station.

To achieve these objects and other advantages and in accordance with the purpose of the invention, as embodied and broadly described herein, a data processing method of a digital broadcasting receiver according to one embodiment of the present invention comprises receiving a mobile/handheld (MH) broadcasting signal including mobile service data and main service data; generating RS(Reed-Solomon) frames from the received MH broadcasting signal; extracting ESG electronic service guide) data from the generated RS frame; extracting SDP (session description protocol) data from the extracted ESG data; checking a port number corresponding to subtitle having reference information, among the extracted SDP data; and controlling the subtitle having reference information using the checked port number so that the subtitle having reference information is displayed.

In another aspect of the present invention, a digital broadcasting receiver according to one embodiment of the present invention comprises a receiver receiving a mobile/handheld (MH) broadcasting signal including mobile service data and main service data; a generator generating RS(Reed-Solomon) frames from the received MH broadcasting signal; a decoding unit decoding ESG (electronic service guide) data from the generated RS frame; an extracting unit extracting SDP (session description protocol) data from the decoded ESG data; a checking unit checking a port number corresponding to subtitle having reference information, among the extracted SDP data; and an acquisition unit acquiring text information of the subtitle having reference information using the checked port number.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 illustrates an example of SDP data;

FIG. 5 illustrates an example of a case where subtitling of timed-text of 3GPP exists within SDP data;

FIG. 6 illustrates an example of a case where subtitling of text of 3GPP exists within SDP data;

FIG. 7 illustrates an example of information for transmitting 3GPP timed text data to RTP payload format, which is added to SDP data;

FIG. 8 illustrates an example of information for transmitting 3GPP text data to RTP payload format, which is added to SDP data;

FIG. 11 illustrates a data structure of subtitle having reference information according to one embodiment of the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, the embodiments of the present invention will be described with reference to the accompanying drawings and the description disclosed in the accompanying drawings, but the present invention is not limited by the embodiments.

Although the terms used in the present invention are selected from generally known and used terms considering their functions in the present invention, the terms can be modified depending on intention of a person skilled in the art, practices, or the advent of new technology. Also, in special case, the terms mentioned in the description of the present invention may be selected by the applicant at his or her discretion, the detailed meanings of which are described in relevant parts of the description herein. Accordingly, the terms used herein should be understood not simply by the actual terms used but by the meaning lying within and the description disclosed herein.

Figure 1:
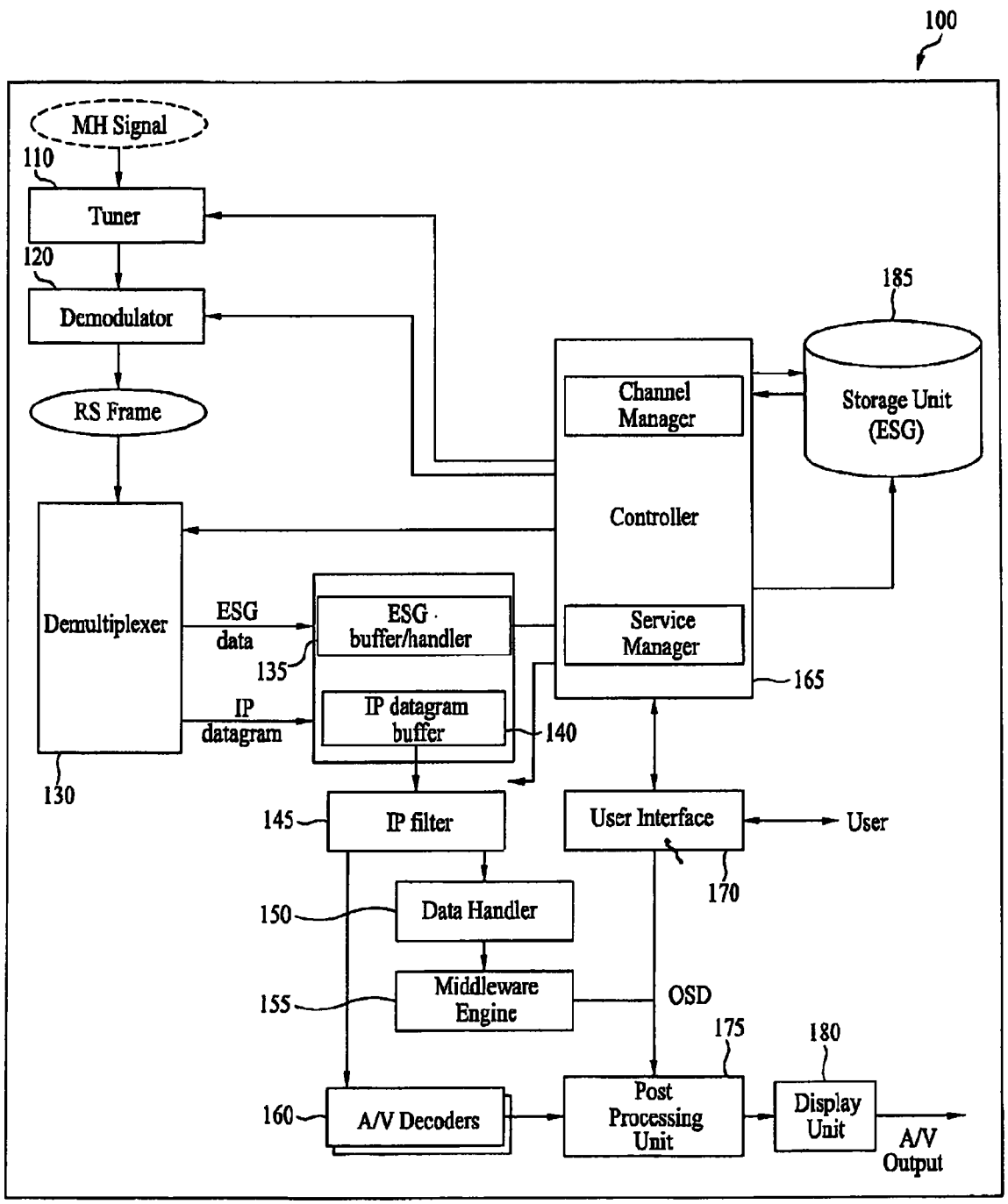
FIG. 1 is a block diagram illustrating a configuration module of a digital broadcasting receiver according to one embodiment of the present invention.

FIG. 1 is a block diagram illustrating a configuration module of a digital broadcasting receiver according to one embodiment of the present invention. Hereinafter, an operation of a digital broadcasting receiver according to one embodiment of the present invention will be described with reference to FIG. 1.

As illustrated in FIG. 1, the digital broadcasting receiver 100 can include a tuner 110, a demodulator 120, a demultiplexer 130, temporary storage units 135 and 140, an IP filter 145, a controller 165, a storage unit 185, an A/V decoder 160, a data handler 150, a middleware engine 155, a user interface 170, a post processing unit 175, and a display unit 180.

The tuner 110 can receive a broadcasting signal transmitted through at least one of a fixed receiving channel and a mobile receiving channel. Namely, the broadcasting signal received by the tuner 110 could a mobile/handheld (MH) broadcasting signal which includes mobile service data and main service data. The tuner 110 tunes a channel selected by a user and outputs a broadcasting signal of the corresponding channel. For example, the broadcasting signal received from the fixed receiving channel can include terrestrial/cable broadcasting signals.

Meanwhile, among the terms used in the present invention, MH is abbreviated from mobile handheld, and is opposite to a fixed type. MH service data includes at least one of mobile service data and handheld service data. For convenience of description in the present invention, the MH service data may be referred to as mobile service data. At this time, any service data which means mobile data or portable data, as well as MH service data, can be included in the mobile service data. Accordingly, the mobile service data will not be limited to the MH service data.

The mobile service data defined as above may be data having information such as program working file and stock information, or may be A/V data. Particularly, the mobile service data is service data for portable or mobile terminal (or broadcasting receiver), and may be A/V data having smaller resolution and smaller data rate than those of the main service data. For example, if A/V codec used for the existing main service is MPEG-2 codec, MPEG-4 AVC (advanced video coding), SVC (scalable video coding), etc., which have more excellent video compression efficiency, may be used as the A/V codec for mobile service. Also, any kind of data may be transmitted as the mobile service data. For example, TPEG (transport protocol expert group) data for broadcasting traffic information in real-time can be transmitted as the mobile service data.

Furthermore, examples of data services using the mobile service data according to the present invention include, but are not limited to, weather service, traffic service, stock service, viewer joining quiz program, real-time public opinion census, interactive education broadcasting, game service, information provision service on plot of drama, character, background music, and drama studio, information provision service on past game results of sports, profile of player, and score of player, and information provision service on product information and program per service, media, time, or theme to order the product.

The demodulator 120 demodulates the signal output from the tuner 110 and outputs the demodulated signal. The demodulator 120 can demodulate at least one of the broadcasting signal transmitted from the fixed receiving channel and the broadcasting signal transmitted from the mobile receiving signal. For example, the demodulator 120 can demodulate 8VSB/16VSB modulation signals or 64QAM/256QAM modulation signals. The demodulator 120 may disregard a broadcasting signal according to a null packet transmitted to adjust a transmission rate among the receiving signals, without performing demodulation for the broadcasting signal. Data output from the demodulator 120 could be RS packet type data. The RS packet data are output to the demultiplexer 130.

The demultiplexer 130 can demultiplex RS packets output from the demodulator 120 and output the demultiplexed RS packets. The demultiplexer 130 can directly receive mobile service data streams or main service data streams from an external device. For example, if the broadcasting receiving receiver can receive broadcasting streams from a digital VCR, the demultiplexer 130 can receive broadcasting streams directly through a predetermined interface (for example, IEEE 1394 type interface) and demultiplex the received broadcasting streams. The demultiplexer 130 can demultiplex section data, ESG information, and IP datagram among the received broadcasting streams. For example, the demultiplexer 130 respectively outputs ESG information to ESG buffer 135 of the temporary storage unit and IP datagram to an IP datagram buffer 140 of the temporary storage unit in accordance with a value of a type indicator of RS packet header and stores the data in the corresponding buffers.

Meanwhile, the demultiplexer 130 illustrated in FIG. 1 can split ESG information only from the IP datagram and then output the ESG information even though the ESG information is located on IP/UDP, i.e., the ESG information is transmitted to the IP datagram. After the ESG information is output to the IP datagram, IP header may be removed from the ESG information and payload may only be stored in the ESG buffer 135.

The IP datagram stored in the IP datagram buffer 140 is output to the IP filter 145 so that a broadcasting signal selected by the controller 165 is output. Also, the ESG information stored in the ESG buffer 135 can again be stored in the storage unit 185. The ESG information stored in the storage unit 185 or the ESG buffer 135 is signal-processed by the controller 165, transmitted to the post processor 175, and displayed on the screen.

The IP filter 145 outputs only datagram, which includes video/audio signals of broadcasting selected by a user, among IP datagrams, to the A/V decoder 160 under the control of the controller 165. Alternatively, the data included in the IP datagram can be processed by the data handler 150 and then output to the post processor 175 through the middleware engine 155.

The controller 165 can control all blocks illustrated in FIG. 1, and can store information of each channel using the received program table information. For example, the controller 165 can store a channel map of mobile service data and a channel map of main service data by splitting them in a separate channel map type.

Furthermore, the controller 165 can receive a user control signal through the user interface 170. If a control signal such as channel change is received through the user interface 170, the controller 165 controls the tuner 110 and the demodulator 120 with reference to channel map information, so that the user's desired channel signal is output. Moreover, if there is channel conversion between virtual channels which provide main service and mobile service or channel conversion between virtual channels which provide mobile service, the controller 165 can control the tuner 110, the demodulator 120, and the demultiplexer 130 to output a broadcasting signal of a corresponding channel.

For example, if command of channel change is received through the user interface 170, the controller 165 controls the tuner 110 so that the converted channel is selected, with reference to the channel map. Also, the controller 165 controls the demodulator 120 so that a signal of a channel selected by the user is demodulated. For example, if the user selects a mobile receiving channel, the controller 165 controls the demodulator 120 so that only a broadcasting signal of a parade section is demodulated, wherein mobile service data of the mobile receiving channel are multiplexed in the parade section. Meanwhile, if the user selects a fixed receiving channel, the controller 165 controls the demodulator 120 so that only main service data are demodulated. The controller 165 may control the demultiplexer 130 so that a packet of a broadcasting signal of a channel selected by the user is demultiplexed in accordance with the stored channel map. For reference, the terms, parade and burst may be used together to represent the same meaning. Meanwhile, the controller 165 can control the power of the blocks illustrated in FIG. 1. For example, if the digital broadcasting receiver 100 illustrated in FIG. 1 receives mobile service data, the controller 165 can control the power of the digital broadcasting receiver 100 so that the digital broadcasting receiver receives a signal only in the parade section which includes mobile service data of the corresponding channel. Accordingly, the digital broadcasting receiver according to the embodiment of the present invention can greatly reduce power consumption even though it receives data through the mobile receiving channel.

Furthermore, the controller 165 can obtain identification information of the parade section from descriptor of program table information or signaling information. Accordingly, the controller 165 can identify whether a broadcasting signal of a channel desired by the user is transmitted through which parade section, and can control the demodulator 120 so that the demodulator 120 demodulates only the corresponding parade section through parade information. Also, the controller 165 can control the demultiplexer 130 so that a broadcasting signal according to PID of broadcasting streams of the channel desired by the user is demultiplexed.

Meanwhile, the controller 165 can control a service manager or the user interface 170 of the digital broadcasting receiver illustrated in FIG. 1. The controller 165 can update and manage a channel map through the program table information and control the tuner 110 to drive the channel manager in response to channel request of the user.

The channel manager updates the channel map using the newly received program table information and controls the IP filter 145 to output video/audio streams desired by the user. Also, the controller 165 decodes each fragment included in ESG information container or XML file and then output the decoded fragment to the post processor 175 to output the ESG information stored in the storage unit 185.

The storage unit 185 stores ESG information, channel information according to a channel map, or data such as application. For example, the storage unit 185 could be a nonvolatile random access memory (NVRAM), a flash memory, or a memory device that can be used as a PVR device.

The IP filter 145 filters the IP datagram stored in the IP datagram buffer 140. The IP filter 145 can filter the IP datagrams included in the service selected by the user under the control of the service manager of the controller 165 and output the filtered IP datagrams to the A/V decoder 160 and the data handler 150.

Meanwhile, the data processor includes the data handler 150 and the middleware engine 155. The data handler 150 can process and output the data broadcasting signal transmitted from the IP filter 145 in IP datagram type. The middleware engine 155 controls the digital broadcasting receiver to display data of data broadcasting and processes the data to be mixed with A/V data.

The A/V decoder 160 decodes video or/and audio streams output from the demultiplexer 130 and outputs the decoded data. For example, the A/V decoder 160 decodes coded audio streams in accordance with AC-3 mode, or decodes coded video streams in accordance with MPEG-2 mode.

The post processor 175 receives A/V signals transmitted from the A/V decoder 160 and data transmitted from the middleware engine 155. The post processor 175 performs post-processing of the A/V signals and data so that the received A/V signals and data are displayed through the display unit 180. Moreover, the post processor 175 performs data-processing so that on screen display (OSD) is output through the display unit 180 in accordance with control command of the user interface 170.

The display unit 180 displays A/V signals output from the A/V decoder 160. The display unit 180 includes a display part which outputs video image, and a speaker which outputs audio. The display unit 180 displays a graphic signal according to the user interface 170 on a display part together with video image. The graphic signal can include data processed in accordance with ESG information. Accordingly, the user can select, buy, and access service or contents of the displayed ESG information.

Figure 2:
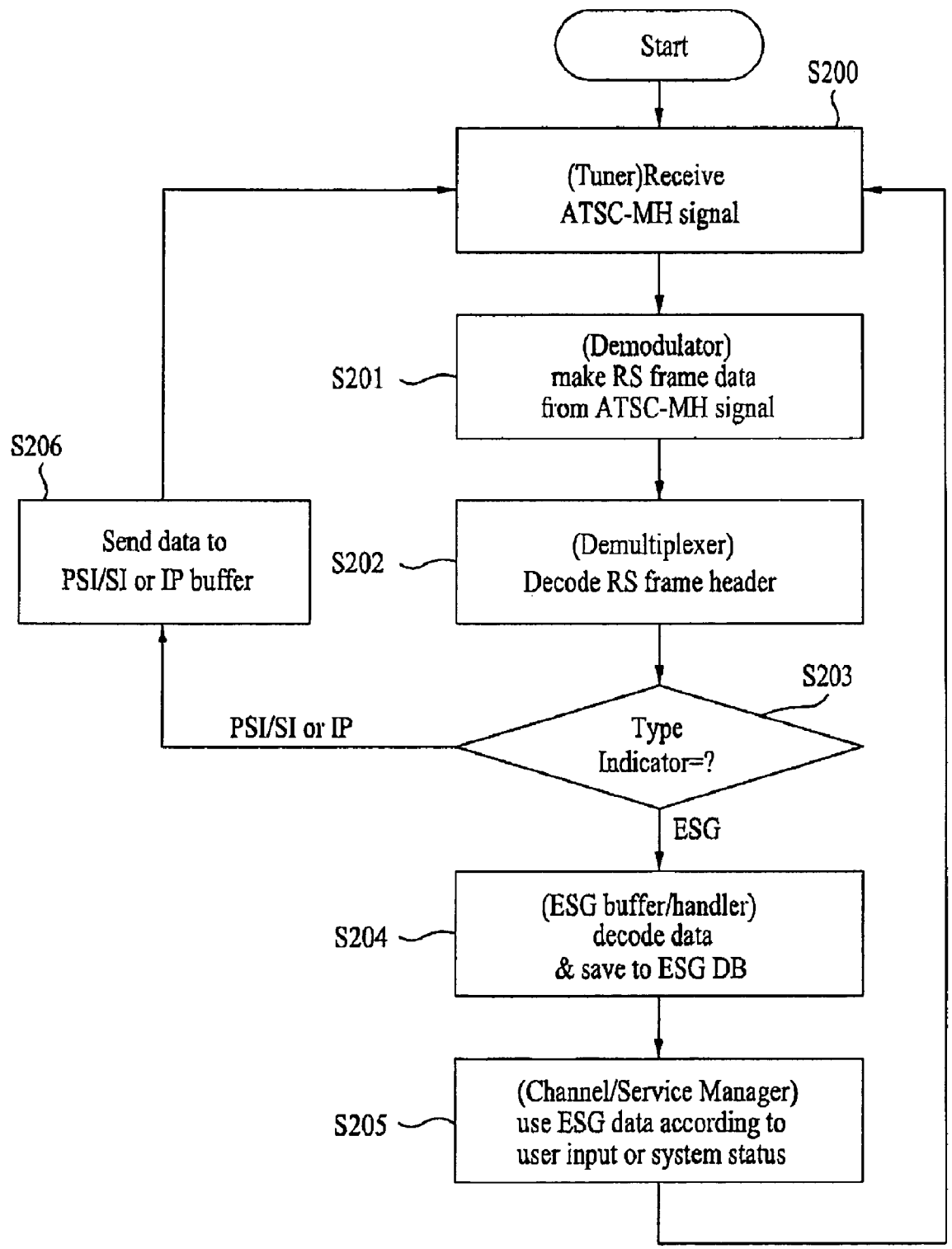
FIG. 2 is a flow chart illustrating a data processing method of a digital broadcasting receiver according to one embodiment of the present invention.

FIG. 2 is a flow chart illustrating a data processing method of a digital broadcasting receiver according to one embodiment of the present invention. The data processing method of the digital broadcasting receiver according to one embodiment of the present invention will be described with reference to FIG. 2.

First of all, the tuner receives a mobile/handheld (MH) broadcasting signal which includes mobile service data and main service data (S200). The demodulator generates RS frame from the received MH broadcasting signal (S201). The demultiplexer demultiplexes data included in payload of the RS frame data using a header of the generated RS frame (S202).

A value of a type indicator field of the header of the RS frame is identified (S203). If the field value corresponds to audio/video/data of IP streams or PSI/SI, payload of the RS frame is transmitted to the buffer and processed therein (S206). On the other hand, if the value of the type indicator field of the header of the RS frame corresponds to ESG information, the ESG buffer/handler decodes ESG information and stores the decoded ESG information in the storage unit (S204). Moreover, the channel manager or service manager of the controller displays ESG information and processes the ESG information in accordance with user's input signal or system status (S205).

Meanwhile, a method of processing data of subtitle having reference information in a mobile digital broadcasting environment through a digital broadcasting receiver according to one embodiment of the present invention will be described in more detail with reference to FIG. 1 and FIG. 2.

The digital broadcasting receiver according to the embodiment of the present invention receives MH broadcasting signal which includes mobile service data and main service data. Also, the digital broadcasting receiver generates RS frame from the received HM broadcasting signal. Moreover, the digital broadcasting receiver extracts ESG (electronic service guide) data from the generated RS frame, and extracts SDP (session description protocol) data from the extracted ESG data. The digital broadcasting receiver checks a port number corresponding to subtitle having reference information among the extracted SDP data. And, the digital broadcasting receiver controls the subtitle having reference information using the checked port number so that the subtitle having reference information is displayed.

Particularly, subtitle having reference information, which is newly defined in the present invention, is a technic different from general subtitle for film or subtitle for visual handicapped person. Namely, the reference information can include a title of an entity represented by the subtitle and an access list that can access the entity. Also, the access list can include at least one of URL (uniform resource locator), E-mail, and phone number. For reference, the entity could be, but not limited to, an advertising object, a service provider, general company, advertising company, or public institutions.

Therefore, if the subtitle having reference information according to the embodiment of the present invention is used, it is advantageous in that limitation in unidirectional subtitle according to the related art can be solved and the entity advertising through the subtitle can easily be connected with the digital broadcasting receiver.

Moreover, the digital broadcasting receiver according to the embodiment of the present invention can display option for storing the subtitle having reference information and option for accessing the entity represented by the subtitle, simultaneously. If the option for storing the subtitle is selected, title of the entity is mapped with URL, E-mail, and phone number that can access the entity so that access information of the subtitle is generated. The generated access information of the subtitle is stored in the storage unit. On the other hand, if the option for accessing the entity represented by the subtitle is selected, at least one or more of URL, E-mail, and phone number that can access the entity are displayed, and the digital broadcasting receiver accesses any one of the displayed URL, E-mail, and phone number using a communication module. More detailed description can be made with reference to FIG. 10 to FIG. 12 as follows.

The digital broadcasting receiver according to the embodiment of the present invention checks a port number corresponding to the subtitle having reference information among the extracted SDP data (first checking step). Also, the digital broadcasting receiver checks a port number corresponding to general subtitle among the extracted SDP data (second checking step). Subsequently, the digital broadcasting receiver controls the subtitle having reference information using the port number checked in the first checking step so that the subtitle having reference information is displayed. Also, the digital broadcasting receiver controls the general subtitle using the port number checked in the second checking step so that the general subtitle is displayed. Hereinafter, more detailed description can be made with reference to FIG. 9.

Meanwhile, a data processing method of subtitle having reference information in a mobile digital broadcasting environment through a digital broadcasting receiver according to another embodiment of the present invention will be described with reference to FIG. 1 and FIG. 2.

The digital broadcasting receiver according to another embodiment of the present invention receives a mobile/handheld (MH) broadcasting signal which includes mobile service data and main service data. Of course, this function may be performed by the tuner 110 of FIG. 1.

A generator of the digital broadcasting receiver generates RS(Reed-Solomon) frame from the received MH broadcasting signal. Of course, this function may be performed by the demodulator 120 of FIG. 1.

A decoding unit of the digital broadcasting receiver decodes ESG (electronic service guide) data from the RS frame. Of course, this function may be performed by the demodulator 120 of FIG. 1. For reference, an ensemble may correspond to a virtual channel in digital broadcasting. Also, the ensemble may correspond to a collection of MH services encoded by a single FEC (forward error correction) code.

An extracting unit of the digital broadcasting receiver extracts SDP (session description protocol) data from the decoded ESG data, and its check unit checks a port number corresponding to subtitle having reference information among the extracted SDP data. And, an acquisition unit of the digital broadcasting receiver acquires text information of the subtitle using the checked port number. Of course, the functions of the extracting unit, the check unit, and the acquisition unit may be performed by the controller 165 of FIG. 1.

Moreover, although omitted for convenience of description, the operation of the digital broadcasting receiver according to one embodiment of the present invention and the operation of the digital broadcasting receiver according to another embodiment of the present invention can be performed in a complementary manner.

Hereinafter, more detailed process of the digital broadcasting receiver according to one embodiment of the present invention and the technology related to the process will be described with reference to FIG. 3 to FIG. 13.

One embodiment of the present invention relates to a system and method that can transmit advertisement in real-time together with a broadcasting signal. Moreover, one embodiment of the present invention can be applied to mobile digital broadcasting such as IPTV and DVB-H, which corresponds to broadcasting using protocol which transmits real-time data based on IP.

Currently, the mobile digital broadcasting receiver such as IPTV and DVB-H can transmit data based on the IP (Internet protocol), and also can transmit broadcasting contents in real-time using the RTP.

Figure 3:
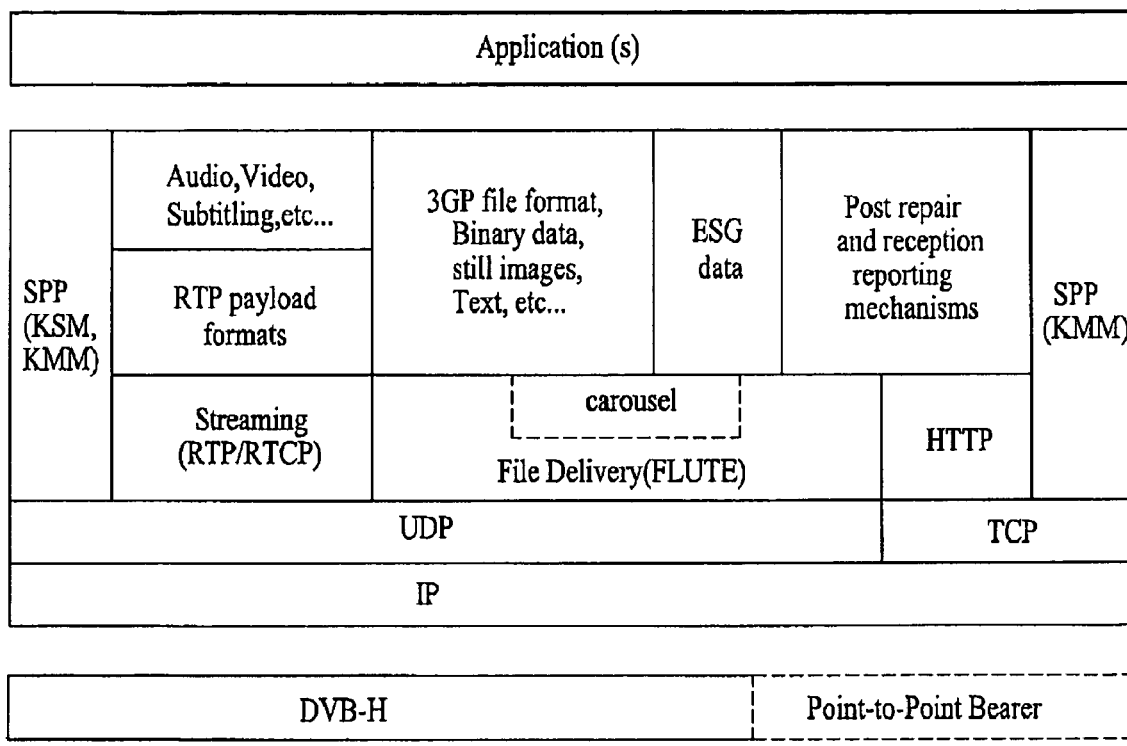
FIG. 3 illustrates a structure of an IPDC protocol for transmitting contents based on IP using DVB-H.

FIG. 3 illustrates a structure of IPDC (Internet protocol data casting) protocol for transmitting contents based on IP using DVB-H. As illustrated in FIG. 3, the IPDC protocol can transmit various contents such as audio, video, subtitling, other information through the RTP in real-time. Meanwhile, in order that the user accesses and views the various contents, the digital broadcasting receiver should first receive ESG data. The ESG provides information that allows the user to select and view proper broadcasting contents using the digital broadcasting receiver.

Therefore, if the user selects specific broadcasting using ESG data received to the digital broadcasting receiver, the digital broadcasting receiver can receive the selected broadcasting using the received ESG data. Meanwhile, in order to receive the selected broadcasting, the digital broadcasting receiver can receive the broadcasting contents by extracting broadcasting information using SDP data having broadcasting receiving information among the ESG data. For reference, FIG. 4 illustrates an example of the aforementioned SDP data.

As described above, according to the IP based data transmission process, subtitling can be transmitted using the RTP in real-time. In this case, there are provided a method of transmitting timed-text of 3GPP using RTP and a method of transmitting text of 3GPP using RTP. In order to transmit subtitling together with broadcasting, transmission information indicating the presence of subtitling should be included in the SDP data. FIG. 5 illustrates an example of a case where subtitling of timed-text of 3GPP exists within the SDP data, and FIG. 6 illustrates an example of a case where subtitling of text of 3GPP exists within the SDP data. Accordingly, if various data related to subtitling are transmitted using an RTP payload format, subtitling information can be provided in real-time.

Hereinafter, a data processing method of a digital broadcasting receiver that can provide subtitle having reference information together with broadcasting selected by a user will be described with reference to the aforementioned description.

For example, if a broadcasting station intends to transmit subtitle having reference information together with general broadcasting through a specific channel, the broadcasting station should define that subtitle having reference information exists within the SDP data among the ESG data. In more detail, subtitle transferred through a specific port may be defined as subtitle having reference information. In this case, the subtitle having reference information can be identified from general subtitle.

FIG. 7 and FIG. 8 illustrate examples of SDP data for transmitting subtitle having reference information together with general subtitle. In more detail, FIG. 7 illustrates an example of information for transmitting 3GPP timed-text data in RTP payload format, wherein the information is added to SDP data, and FIG. 8 illustrates an example of information for transmitting 3GPP text data in RTP payload format, wherein the information is added to SDP data.

Meanwhile, the digital broadcasting receiver can allocate a specific port number to subtitle having reference information among several subtitles. Accordingly, the digital broadcasting receiver transmits information (for example, phone number, URL, E-mail, etc.) that can directly access, not general subtitle, through the specific port number.

Two types of subtitles are illustrated in FIG. 7 and FIG. 8. In the subtitle of each SDP data, a part marked with <dedicated_port> means a port number dedicated for subtitle having reference information, for transmitting subtitle having reference information. Also, a port number 12000 of the SDP data of FIG. 7 and FIG. 8 means a port number for transmitting general subtitle for broadcasting transmitted through this session. Accordingly, as the broadcasting station allocates a port number dedicated for subtitle having reference information distinguished from general subtitle, it is advantageous in that the it is easily to identify subtitle having reference information from general subtitle. Also, it is advantageous in that the broadcasting station can transmit reference information and subtitles in real-time without additional cost.

Figure 9:
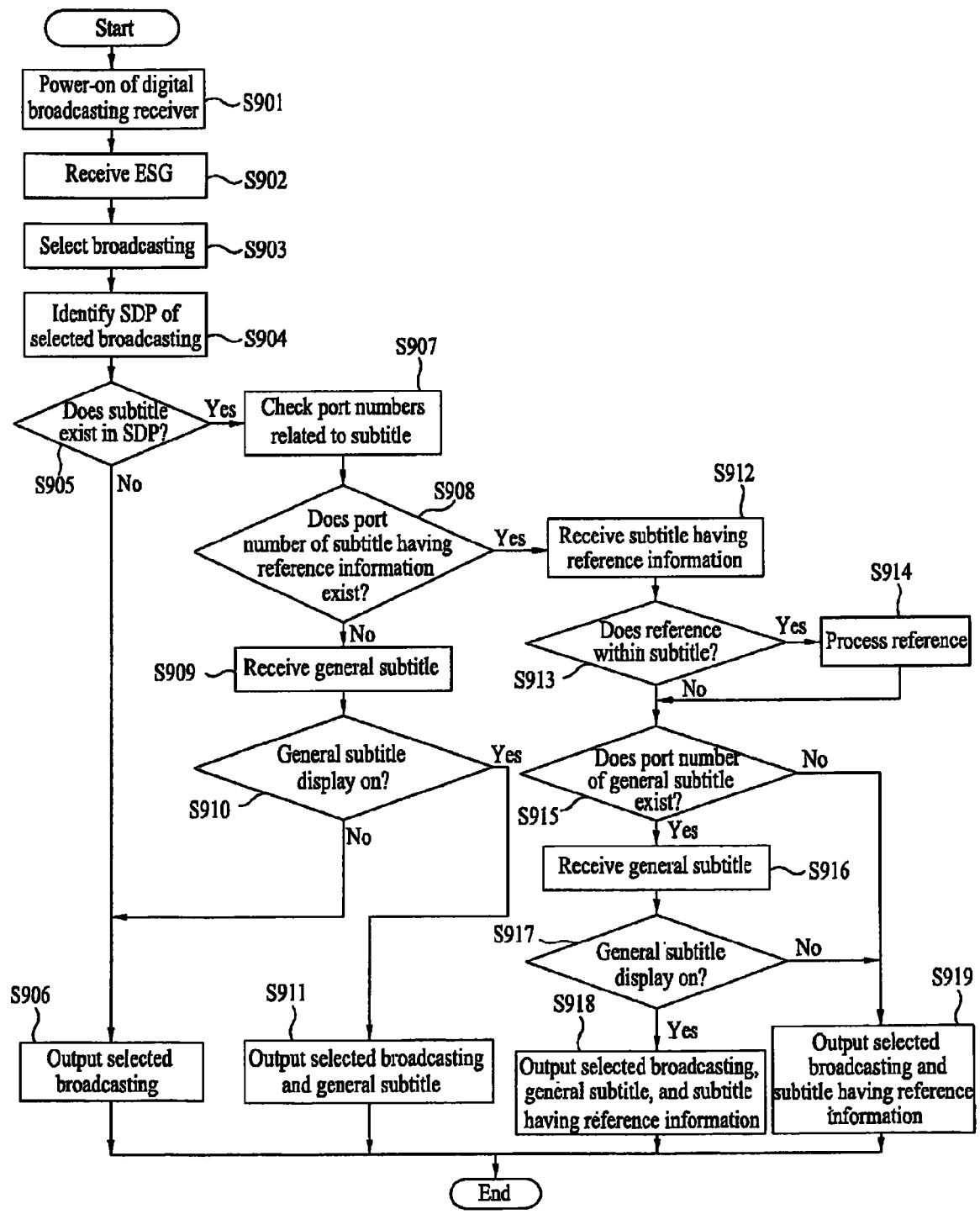
FIG. 9 is a flow chart illustrating an operation of a digital broadcasting receiver according to one embodiment of the present invention, which can process general subtitle and subtitle having reference information.

FIG. 9 is a flow chart illustrating an operation of a digital broadcasting receiver according to one embodiment of the present invention. Hereinafter, a procedure of processing general subtitle and subtitle having reference information in a digital broadcasting receiver according to one embodiment of the present invention will be described with reference to FIG. 9.

If the digital broadcasting receiver according to the embodiment of the present invention is powered on (S901), the digital broadcasting receiver receives ESG data to extract information related to broadcasting currently in service (S902). If the digital broadcasting receiver receives a signal for specific broadcasting selected by the user (S903), the digital broadcasting receiver identifies SDP data related to the specific broadcasting from the received ESG data (S904). At this time, the digital broadcasting receiver determines whether contents related to subtitle exist within the SDP data (S905). As a result of the step S905, if the contents do not exist within the SDP data, the digital broadcasting receiver outputs specific broadcasting without subtitle (S906). On the other hand, if the contents exist within the SDP data, the digital broadcasting receiver checks a port number of each subtitle (S907). The digital broadcasting receiver determines whether a port number corresponding to subtitle having reference information exists using the check result (S908).

As a result of the step S908, if the port number does not exist, the digital broadcasting receiver receives general subtitle (S909), and determines whether display of general subtitle is set (S910). As a result of the step S910, if the display of general subtitle is not set, the digital broadcasting receiver moves to the step S906. On the other hand, as a result of the step S910, if the display of general subtitle is set, the digital broadcasting receiver outputs the specific broadcasting and general subtitle (S911).

Meanwhile, as a result of the step S908, if the port number exists, the digital broadcasting receiver receives subtitle having reference information (S912), determines whether reference information exists within the subtitle (s913), and processes the reference information (S914). Also, the digital broadcasting receiver determines whether general subtitle port number exists within the SDP data (S915). As a result of the step S915, if the general subtitle port number does not exist within the SDP data, the digital broadcasting receiver outputs the specific broadcasting and subtitle having reference information (S919). On the other hand, as a result of the step S915, if the general subtitle port number exists within the SDP data, the digital broadcasting receiver receives general subtitle (S916), and determines whether display of general subtitle is set (S917). As a result of the step S917, if the display of general subtitle is not set, the digital broadcasting receiver outputs the specific broadcasting and subtitle having reference information (S919). On the other hand, as a result of the step S917, if the display of general subtitle is set, the digital broadcasting receiver outputs general subtitle and subtitle having reference information (S918).

In other words, referring to FIG. 9 again, the digital broadcasting receiver according to the embodiment of the present invention checks a port number corresponding to subtitle having reference information among the extracted SDP data (first checking step). Also, the digital broadcasting receiver checks a port number corresponding to general subtitle among the extracted SDP data (second checking step). Subsequently, the digital broadcasting receiver controls the subtitle having reference information using the port number checked in the first checking step so that the subtitle having reference information is displayed. Also, the digital broadcasting receiver controls the general subtitle using the port number checked in the second checking step so that the general subtitle is displayed.

Figure 10:
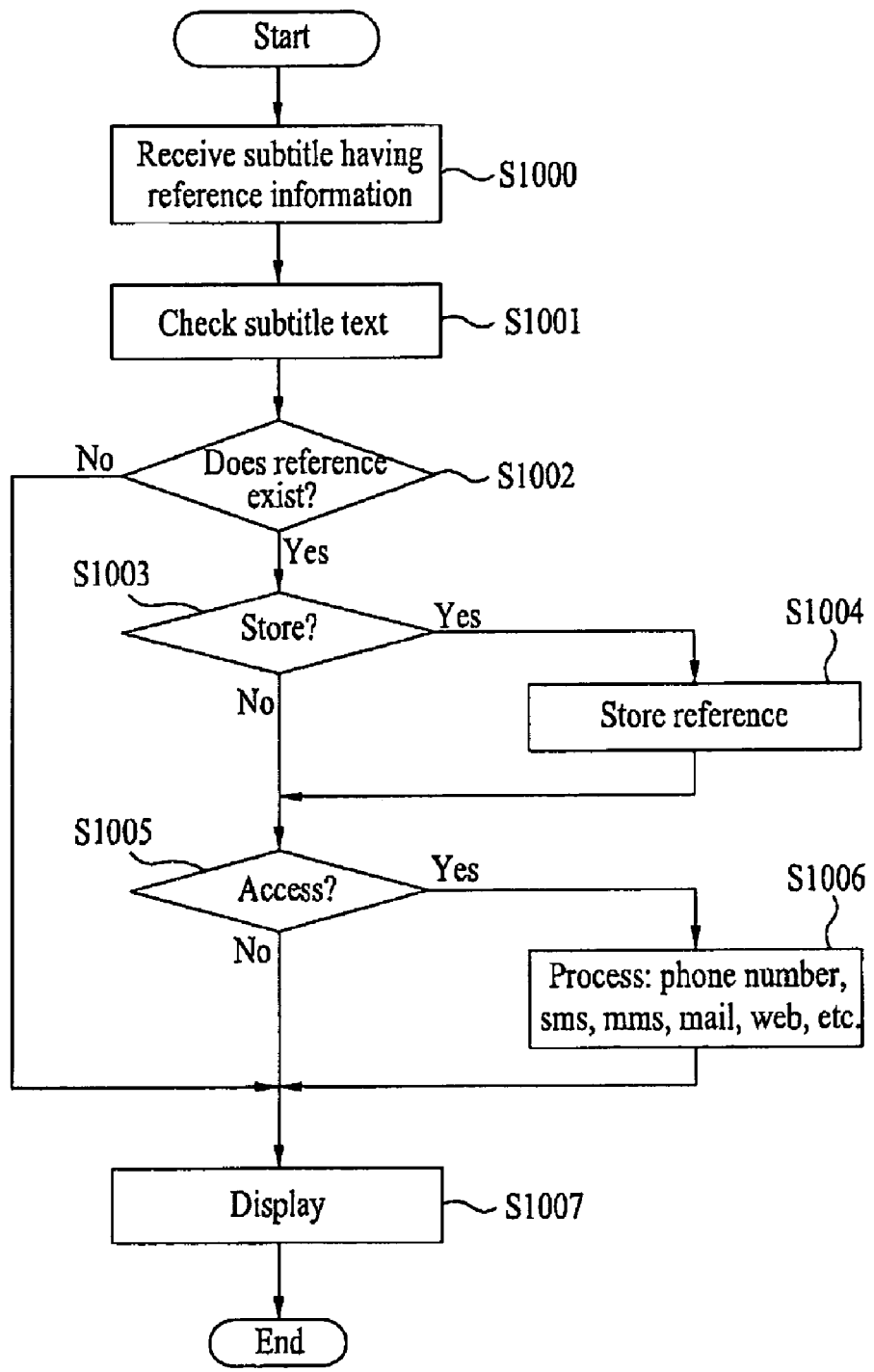
FIG. 10 is a flow chart illustrating a procedure of storing or processing subtitle having reference information in a digital broadcasting receiver according to one embodiment of the present invention.
Figure 12:
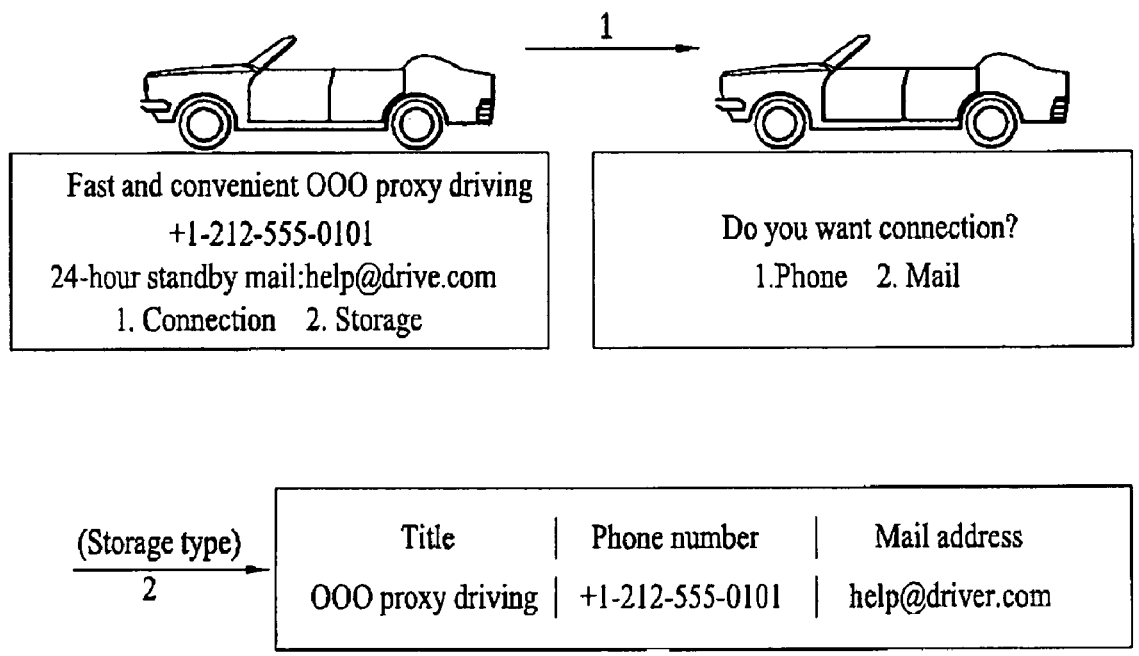
FIG. 12 illustrates a screen where a digital broadcasting receiver according to one embodiment of the present invention displays subtitle having reference information.

FIG. 10 is a flow chart illustrating a procedure of storing or processing subtitle having reference information in a digital broadcasting receiver according to one embodiment of the present invention. FIG. 11 illustrates a data structure of subtitle having reference information according to one embodiment of the present invention. FIG. 12 illustrates a screen where a digital broadcasting receiver according to one embodiment of the present invention displays subtitle having reference information. Hereinafter, the procedure of storing or processing subtitle having reference information in the digital broadcasting receiver according to the embodiment of the present invention will be described in more detail with reference to FIG. 10 to FIG. 12.

As illustrated in FIG. 10, the digital broadcasting receiver according to the embodiment of the present invention receives subtitle having reference information (S1000) and checks text of the subtitle (S1001). Subsequently, the digital broadcasting receiver determines whether reference information is substantially included in the subtitle (S1002). As a result of the step S1002, if the reference information is not included in the subtitle, the digital broadcasting receiver outputs a broadcasting program without subtitle (S1007).

On the other hand, if the reference information is included in the subtitle, the digital broadcasting receiver determines to store the subtitle (S1003). The step S1003 may be performed by default or user's setting.

As a result of the step S1003, if it is set to store the subtitle, the digital broadcasting receiver stores the reference information of the subtitle (S1004), and determines whether a command signal accessing the entity represented by the subtitle has been received (S1005). As a result of the step S1005, if the command signal has not been received, the digital broadcasting receiver outputs the broadcasting program together with the subtitle (S1007). On the other hand, as a result of the step S1005, if the command signal has been received, the digital broadcasting receiver performs a control function so as to be connected with the entity through any one of URL, E-mail, and phone number (S1006).

For reference, the data structure of the subtitle having reference information can be illustrated in FIG. 11. Also, option for storing subtitle and option for accessing the entity represented by the subtitle can be displayed as illustrated in FIG. 12.

Moreover, if the option for storing subtitle is selected on the display screen illustrated in FIG. 12, the digital broadcasting receiver according to the embodiment of the present invention maps title of the entity represented by the subtitle with URL, E-mail, and phone number that can access the entity so that access information of the subtitle is generated additionally. Subsequently, the digital broadcasting receiver can store the generated access information of the subtitle therein.

On the other hand, if the option for accessing the entity represented by the subtitle is selected on the display screen illustrated in FIG. 12, the digital broadcasting receiver according to the embodiment of the present invention displays at least one or more of URL, E-mail, and phine number that can access the entity. Subsequently, the digital broadcasting receiver according to the embodiment of the present invention performs a control function so as to access any one of the displayed URL, E-mail, and phone number using a communication module.

As illustrated in FIG. 10, if the subtitle having reference information exists within the SDP, the subtitle can be stored separately. Accordingly, a viewer who has viewed a broadcasting program can access the entity represented by the subtitle in real-time, and can also access the entity represented by the subtitle by easily retrieving the subtitle stored in a memory even after the broadcasting program ends.

Particularly, the embodiment corresponding to a case where a phone number is used as the reference information will be described in more detail.

If the phone number is included in the subtitle having reference information, the digital broadcasting receiver should recognize that an accessible phone number exists within the subtitle. To this end, in the embodiment of the present invention, Tel URI (Telephone uniform resource identifier) is used as a method for marking a phone number within the subtitle having reference information. In this case, the phone number can be expressed as follows.

tel:+1-212-555-0101

Accordingly, the digital broadcasting receiver which has received subtitle having Tel URI type phone number may have a problem in identifying whether to recognize the Tel URI type phone number as text or real phone number. In order to solve this problem, in the present invention, Tel URI is used in HTML (hyper text markup language).

As described above, Tel URI can generally be marked with "tel:+1-212-555-0101". Such Tel URI can be marked in HTML as follows. Particularly, Tel URI may be implemented using XML (extensible markup language).

<a href="tel:+1-212-555-0101">+1-212-555-0101</a>

Therefore, if HTML, XML, etc. are used, digital broadcasting receiver according to the embodiment of the present invention can easily identify whether the phone number of subtitle is general text or real phone number. Namely, the digital broadcasting receiver can recognize a mark of <a href="tel:+1-212-555-0101">, and if Tel URI is recognized from the mark, the digital broadcasting receiver can identify that the phone number within the subtitle is a real phone number that can be connected with the entity represented by the subtitle. Moreover, the digital broadcasting receiver can store Tel URI within HTML in a storage unit (for example, phone directory dedicated for advertisement).

However, if the digital broadcasting receiver receives only a subtitle having Tel URI type phone number within the aforementioned HTML, a problem occurs in that the digital broadcasting receiver cannot identify whether the phone number is associated with what entity. In order to solve this problem, in the embodiment of the present invention, it is possible to mark information as to whether the identified phone number is a phone number that can access what entity, using a text of HTML. The information can be expressed as follows.

<a href="tel:+1-212-555-0101" title="ooo proxy driving">+1-212-555-0101</a>

Therefore, the digital broadcasting receiver according to the embodiment of the present invention recognizes Tel URI after recognizing HTML text within the subtitle having reference information, so that the digital broadcasting receiver can identify that the recognized phone number is associated with "ooo proxy driving". Namely, the title text is information for identifying whether the corresponding phone number is associated with what entity (for example, advertisement provider). The digital broadcasting receiver can map the phone number within the subtitle with the entity (corresponding to the title text) represented by the subtitle) and store them in the storage unit (for example, phone directory dedicated for advertisement) together. If the aforementioned process is used, it is advantageous in that the user of the digital broadcasting receiver can easily retrieve entity corresponding to the phone number of the subtitle.

Figure 13:
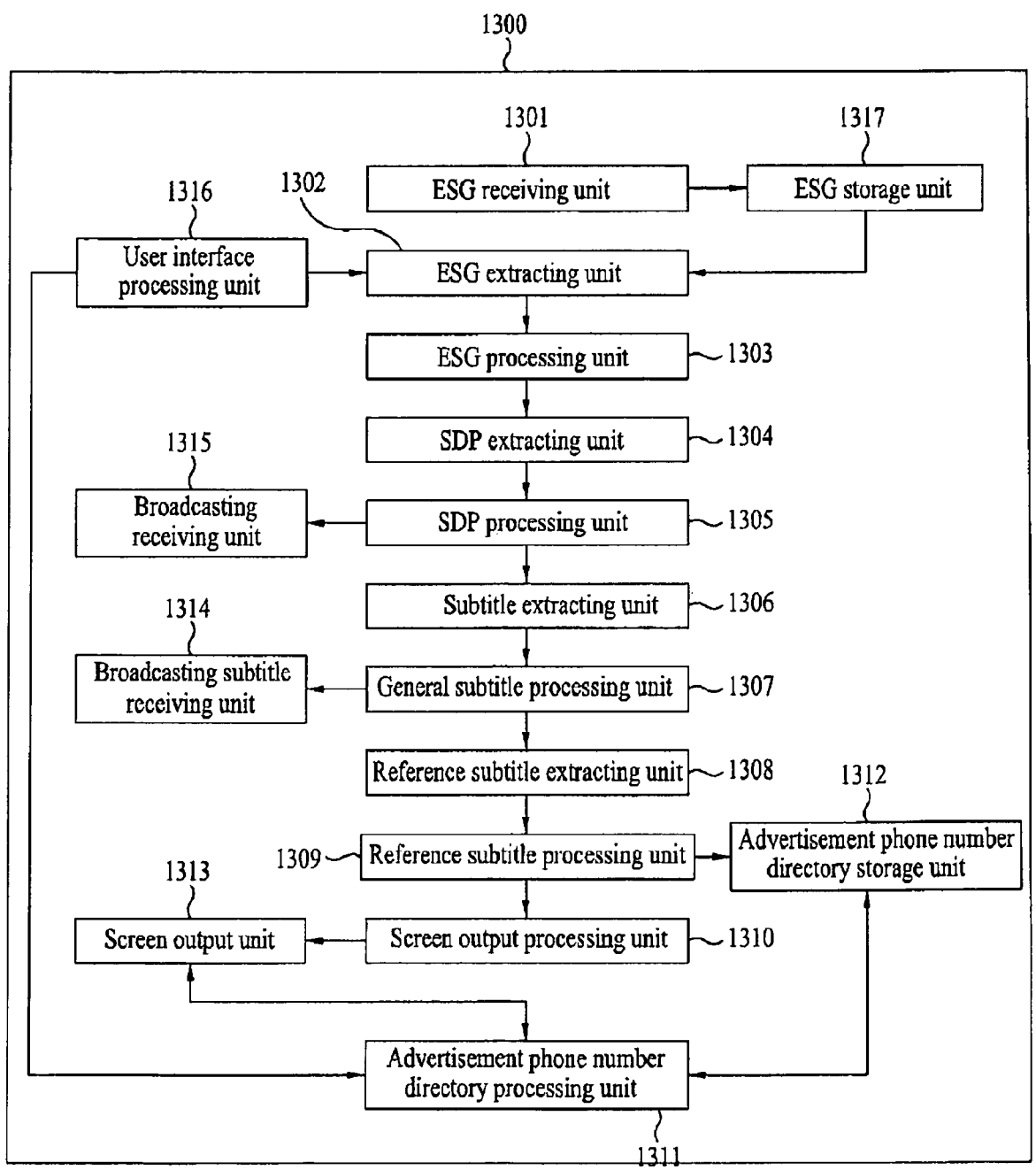
FIG. 13 illustrates a digital broadcasting receiver according to one embodiment of the present invention more briefly.

FIG. 13 illustrates a digital broadcasting receiver according to one embodiment of the present invention more briefly. For reference, modules of the digital broadcasting receiver illustrated in FIG. 13 may be added to FIG. 1, or may be designed so that the modules of FIG. 1 substitute for functions of the modules illustrated in FIG. 13. Meanwhile, since the digital broadcasting receiver has been described as above, the digital broadcasting receiver of FIG. 13 will be described in brief. Of course, the digital broadcasting receiver of FIG. 13 can easily be understood by those skilled in the art through the description of FIG. 1 to FIG. 12.

As illustrated in FIG. 13, the digital broadcasting receiver 1300 according to the embodiment of the present invention includes an ESG receiving unit 1301, an ESG storage unit 1317, an ESG extracting unit 1302, an ESG processing unit 1303, an SDP extracting unit 1304, an SDP processing unit 1305, a subtitle extracting unit 1306, a general subtitle processing unit 1307, a reference subtitle extracting unit 1308, a reference subtitle processing unit 1309, a screen display processing unit 1310, an advertisement phone directory processing unit 1311, an advertisement phone directory storage unit 1312, a user interface processing unit 1316, a broadcasting receiving unit 1315, a broadcasting subtitle receiving unit 1314, and a screen output unit 1313. Of course, these units can be merged, modified, added, and deleted in accordance with the need of those skilled in the art.

The ESG receiving unit 1301 receives ESG data. The ESG storage unit 1317 stores the received ESG data. The ESG extracting unit 1302 extracts. ESG data stored in the ESG storage unit 1317. The ESG processing unit 1303 processes the extracted ESG data. The SDP extracting unit 1304 extracts SDP data among the ESG data. The SDP processing unit 1305 processes the extracted SDP data. The subtitle extracting unit 1306 extracts subtitles using the processed SDP data.

Meanwhile, the general subtitle extracting unit 1307 processes general subtitle among the extracted subtitles. The reference subtitle extracting unit 1308 extracts subtitle having reference information among the extracted subtitles. The reference subtitle processing unit 1309 processes the extracted subtitle having reference information.

The processed subtitle is stored in the advertisement phone directory storage unit 1312 and the advertisement phone directory processing unit 1311, or is output on the screen under the control of the screen output processing unit 1310 and the screen output unit 1313.

Furthermore, the user interface processing unit 1316 controls the ESG extracting unit 1302 and the advertisement phone directory processing unit 1311. The processed result of the SDP processing unit 1305 is transmitted to the broadcasting receiving unit 1315, and the processed result of the general subtitle processing unit 1307 is transmitted to the broadcasting subtitle receiving unit 1314.

As described above, if the subtitle having reference information newly suggested in the embodiment of the present invention is used, the broadcasting station can transmit information, which can access the entity represented by the subtitle, in real-time. Also, the broadcasting station can implement the transmission procedure without additional cost.

Furthermore, if the subtitle having reference information newly suggested in the embodiment of the present invention is used, more users can use the phone number of the subtitle provided from the broadcasting station. Accordingly, it is advantageous in that communication providers can create profits according to such use of phone number, and that more mobile digital broadcasting receivers can be sold to buyers.

Furthermore, if the subtitle having reference information newly suggested in the embodiment of the present invention is used, advertisement effect increases and viewer's opinion can be received through short message service of a cellular phone or e-mail in real-time. Namely, bi-directional digital broadcasting can substantially be performed.

Moreover, since the subtitle having reference information newly suggested in the embodiment of the present invention can be stored per entity, it is advantageous in that the user does not need to write a memo of the corresponding reference information.

The method according to the present invention can be implemented in a program instruction type that can be performed through various computer means and can be recorded in a computer readable recording medium. The computer readable recording medium can include program instructions, data files, and data structures, alone or in combination. The program instructions recorded in the computer readable recording medium are designed specially for the present invention but may be well known to those skilled in the computer software. Examples of the computer readable recording medium include magnetic media such as hard disks, floppy disks, and magnetic tapes, optical media such as CD-ROM and DVD, magneto-optical media such as floppy disks, and a hardware device such as ROM, RAM, and flash memory, which is configured to store and perform program instructions. Examples of the program instructions include a machine language code made by a compiler and a high-level language code implemented using an interpreter by a computer. The hardware device can be configured as at least one software module to perform the operation of the present invention.

Therefore, according to one embodiment of the present invention, there are provided a digital broadcasting receiver and a data processing method that can directly access an entity associated with text, subtitle, etc. using the text, the subtitle, etc., which are provided by a broadcasting station.

Also, according to another embodiment of the present invention, there are provided a digital broadcasting receiver and the data processing method that can increase utility of mobile digital broadcasting by creating a new profit model of a mobile communication provider as well as a broadcasting station.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A data processing method of a digital broadcasting receiver, the data processing method comprising:
  receiving a mobile/handheld (MH) broadcasting signal including mobile service data and main service data;
  generating RS (Reed-Solomon) frames from the received MH broadcasting signal;
  extracting ESG (electronic service guide) data from the generated RS frame;
  extracting SDP (session description protocol) data from the extracted ESG data;
  checking a port number corresponding to a subtitle having reference information among the extracted SDP data, wherein the reference information includes a title of an entity represented by the subtitle and at least a URL (uniform resource locator), an E-mail, or a phone number that can access the entity;
  checking a port number corresponding to a general subtitle among the extracted SDP data;
  controlling the subtitle using the checked port number corresponding to the subtitle to display the subtitle having the reference information;
  controlling the general subtitle using the checked port number corresponding to the general subtitle to display the general subtitle;
  displaying a first option for storing the subtitle and a second option for accessing the entity represented by the subtitle;

generating access information of the subtitle by mapping the title of the entity with the at least URL, E-mail, or phone number, and storing the generated access information of the subtitle when the first option is selected;

displaying the at least URL, E-mail, or phone number and controlling the subtitle to access the displayed at least URL, E-mail, or phone number via a communication module of the digital broadcasting receiver when the second option is selected.

2. The method of claim 1, further comprising: storing a program on a non-transitory computer readable recording medium, the program causing a processor to perform the generating of the RS frames, the extracting of the ESG data, the extracting of the SDP data, the checking, the controlling, the displaying of the first option, the generating of the access information, and the displaying of the at least URL, E-mail, or phone number.

3. A digital broadcasting receiver comprising:

a receiver receiving a mobile/handheld (MH) broadcasting signal including mobile service data and main service data;

a generator generating RS (Reed-Solomon) frames from the received MH broadcasting signal;

a decoding unit decoding ESG (electronic service guide) data from the generated RS frame;

an extracting unit extracting SDP (session description protocol) data from the decoded ESG data;

a checking unit checking at least a port number corresponding to a subtitle having reference information among the extracted SDP data, the checking unit further checking a port number corresponding to a general subtitle among the extracted SDP data, wherein the reference information includes a title of an entity represented by the subtitle and at least a URL (uniform resource locator), an E-mail, or a phone number that can access the entity;

a controller configured to control:
the subtitle, using the checked port number corresponding to the subtitle, to display the subtitle having the reference information; and
the general subtitle, using the checked port number corresponding to the general subtitle, to display the general subtitle; and a display unit displaying a first option for storing the subtitle and a second option for accessing the entity represented by the subtitle, wherein the controller is further configured to:

generate access information of the subtitle by mapping the title of the entity with the at least URL, E-mail, or phone number, and store the generated access information of the subtitle when the first option is selected;

control the display unit to display the at least URL, E-mail, or phone number and control a communication module of the digital broadcasting receiver to access the displayed at least URL, E-mail, or phone number when the second option is selected.

* * * * *